US005506971A

United States Patent [19]

Gullette et al.

[11] Patent Number: 5,506,971
[45] Date of Patent: Apr. 9, 1996

[54] METHOD AND APPARATUS FOR PERFORMING A SNOOP-RETRY PROTOCOL IN A DATA PROCESSING SYSTEM

[75] Inventors: James B. Gullette, Austin; William C. Moyer, Dripping Springs; Michael J. Garcia, Austin, all of Tex.

[73] Assignee: Motorola, Inc., Schaumburg, Ill.

[21] Appl. No.: 386,252

[22] Filed: Feb. 9, 1995

Related U.S. Application Data

[63] Continuation of Ser. No. 845,890, Mar. 4, 1992, abandoned.
[51] Int. Cl.$^6$ .............................. G06F 13/14; G06F 13/42
[52] U.S. Cl. ........................................ 395/296; 395/473
[58] Field of Search ....................................... 395/425, 325, 395/275, 725, 200, 445, 446, 473, 468, 296, 303, 732

[56] References Cited

U.S. PATENT DOCUMENTS

| | | | |
|---|---|---|---|
| 4,583,160 | 4/1986 | Iguma | 395/325 |
| 4,602,327 | 7/1986 | LaViolette et al. | 395/325 |
| 4,703,420 | 10/1987 | Irwin | 395/325 |
| 4,987,529 | 1/1991 | Craft | 395/325 |
| 5,041,962 | 8/1991 | Lunsford | 395/325 |
| 5,060,139 | 10/1991 | Theus | 395/325 |
| 5,072,363 | 12/1991 | Gallagher | 395/725 |
| 5,191,649 | 3/1993 | Cadambi et al. | 395/325 |
| 5,195,185 | 3/1993 | Marenin | 395/325 |
| 5,257,356 | 10/1993 | Brockmann et al. | 395/325 |
| 5,276,887 | 1/1994 | Haynie | 395/725 |

FOREIGN PATENT DOCUMENTS

| | | |
|---|---|---|
| 0392657A1 | 10/1990 | European Pat. Off. . |
| 0425843A2 | 5/1991 | European Pat. Off. . |
| 9432524A2 | 6/1991 | European Pat. Off. . |

*Primary Examiner*—Glenn A. Auve
*Attorney, Agent, or Firm*—Charlotte B. Whitaker

[57] ABSTRACT

A data processing system (10) and method for performing a snoop-retry protocol using an arbiter (14). Multiple bus masters (12, 16, 17) are coupled to multiple shared buses (20, 22, 24, 26). Each bus master (12, 16, 17) may initiate a bus transaction ("initiating master"), or snoop the bus transaction ("snooping bus master") occurring on a shared bus (20). When an initiating processor requests access to a dirty cache line in a memory (18), a snooping bus master asserts a shared address retry (ARTRY*) signal to inform the initiating processor to relinquish ownership of the shared bus (20) and retry the bus transaction. Upon detecting the shared ARTRY* signal, all potential bus masters remove their bus requests and ignore any bus grants from the arbiter (14), thus allowing the snooping processor which asserted the ARTRY* signal to gain ownership of the shared bus (20) to perform the snoop copyback. The arbiter (14) provides simple arbitration support to guarantee the update of the memory (18) has the highest priority among masters (12, 16, 17).

12 Claims, 2 Drawing Sheets

METHOD AND APPARATUS FOR PERFORMING A SNOOP-RETRY PROTOCOL IN A DATA PROCESSING SYSTEM

This application is a continuation of prior application Ser. No. 07/845,890, filed Mar. 4, 1992, now abandoned.

CROSS-REFERENCE TO A RELATED APPLICATION

This patent application is related to a U.S. patent application U.S. Pat. No. 5,416,910 entitled "A Method and Apparatus for Performing Bus Arbitration in a Data Processing System", and filed concurrently herewith.

1. Field of the Invention

This invention relates generally to data processing systems, and more particularly to data processing systems which perform bus arbitration.

2. Background of the Invention

Many of today's high performance data processing systems use multiple microprocessors with on-chip caches. Typically, these data processing systems employ a technique called bus "snooping" to maintain cache coherency between the multiple microprocessors. Generally, when a microprocessor snooping a bus transaction detects a cache hit on a cache entry marked as "dirty", the snooping microprocessor ("snooper") will force the current ("original") bus master to relinquish ownership of the bus and to retry the bus transaction at a later time. The snooper must then take ownership of the bus and update main memory with the offending cache line. The original bus master will continue to "retry" to access the cache line until the snooper has completed the memory update. This process is generally referred to as a "Snoop-Retry" protocol.

Accordingly, once the original bus master has relinquished bus ownership due to a snoop-retry, it is desirable for the snooper with the dirty cache line to have the highest priority for ownership of the next bus tenure. Essentially, if the snooper's request is not given the "first chance" for bus ownership, other bus masters (including the original bus master) may prevent the snooper from gaining bus ownership, thereby delaying forward progress of the original bus transaction. Although a conventional arbiter could guarantee that the microprocessor signalling the snoop hit is given the highest priority, this would require additional arbiter inputs and added logic complexity. Thus, the cost and complexity associated with implementation of external bus arbitration logic is a significant factor for consideration when designing data processing system having multiple bus masters.

SUMMARY OF THE INVENTION

In one form, the present invention comprises a data processing system and method for performing a snoop-retry bus arbitration protocol using an arbiter. The data processing system has a predetermined number of bus masters each of which is coupled to a memory system, via a predetermined number of shared buses. The arbiter is coupled to each of the predetermined number of bus masters to control allocation of bus ownership. A snooping processor asserts a first control signal in response to detecting a snoop hit on a first bus transaction. The first control signal notifies a first bus master that a data entry for an address requested during the first bus transaction is resident in the snooping processor, and to relinquish ownership of a first shared bus and retry the bus transaction. The first bus master and each of a predetermined number of potential bus masters detect assertion of the first control signal by the snooping processor, and each removes a bus request signal from the arbiter, and ignores assertion by the arbiter of a bus grant signal, in response thereto. Each of the predetermined number of potential bus masters suppresses assertion of their bus request signal to allow the snooping processor to gain ownership of the shared bus.

The present invention will be understood by one skilled in the art from the detailed description below in conjunction with the accompanying drawings.

DETAILED DESCRIPTION OF A PREFERRED EMBODIMENT

The terms "assert" and "assertion" are used when referring to the rendering of a signal or similar apparatus into its logically true (active) state, whereas, "negate" and "negation" are used when the signal or other apparatus is rendered into its logically false (inactive) state. The asterisk symbol will be used to indicate a complemented signal. For example, BUS REQUEST* indicates a signal that is the complementary logic state of the BUS REQUEST signal.

Figure 1:
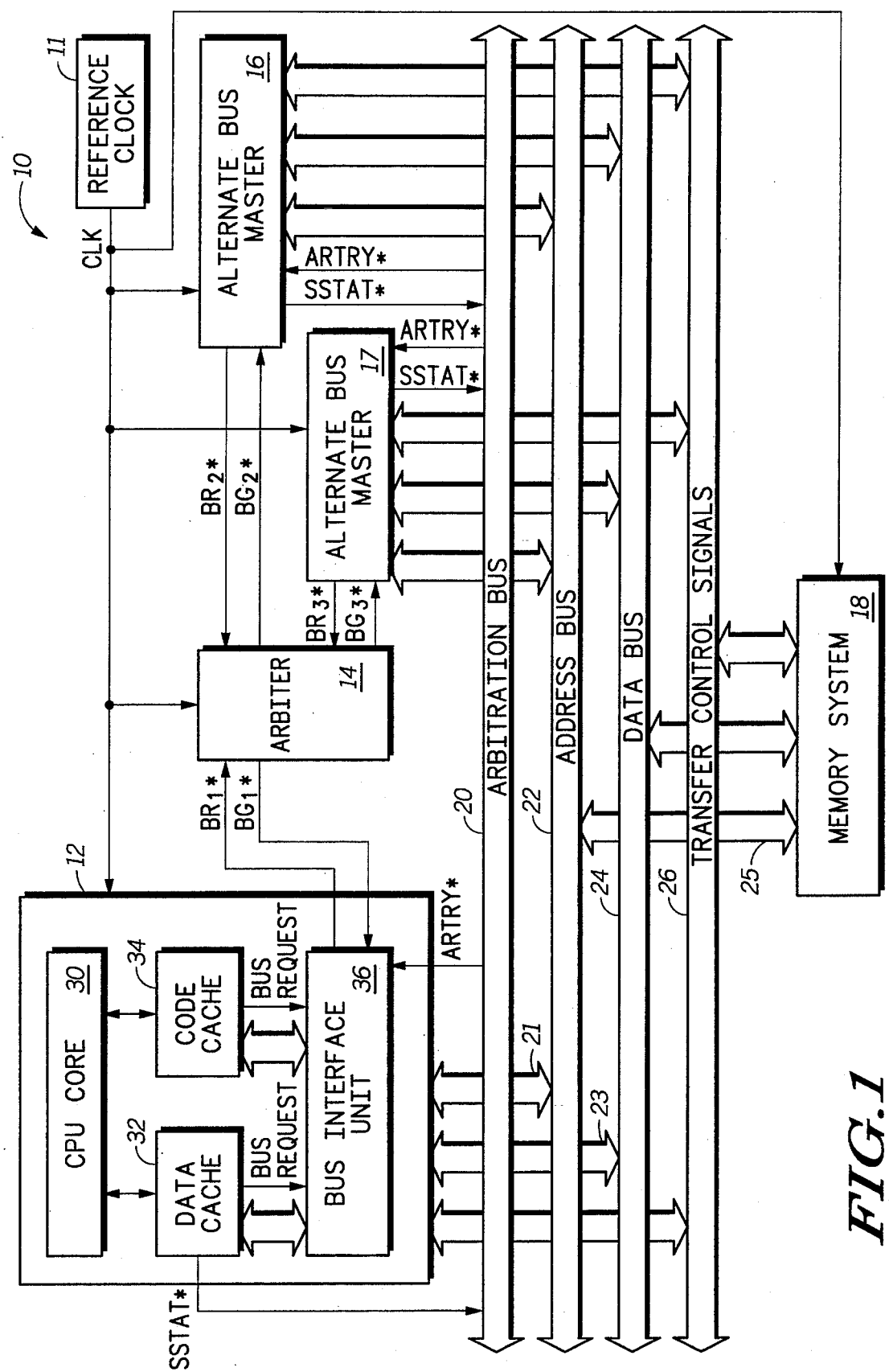
FIG. 1 illustrates, in block diagram form, a data processing system for performing a snoop-retry protocol in accordance with a preferred embodiment of the present invention.

Illustrated in FIG. 1 is a preferred embodiment of a multi-master data processing system 10 which uses a centralized arbitration system to perform a snoop-retry protocol, in accordance with the present invention. In the illustrated form, an arbitration bus 20, an address bus 22, a data bus 24, and transfer control signal lines 26 are coupled to, and shared by, a data processor (DP) 12 and other alternate bus masters (ABM) 16–17, to access an external memory system 18. The transfer control signals provide the basic handshake between the bus masters (DP 12 and ABMs 16–17) and the memory system 18. As illustrated in FIG. 1, an external arbiter 14 is coupled to the data processor 12 and the alternate bus masters 16–17 to control the allocation of the shared address bus 22. A reference clock generator 11 provides a clock (CLK) signal to the bus masters (data processor 12 and ABMs 16–17, the arbiter 14, and the memory system 18. In system 10, data processor 12 uses an internal Harvard architecture wherein an instruction sequencer (not shown) in a CPU core 30 fetches instructions from an instruction cache memory management unit (CODE CACHE) 32, and a load/store unit (not shown) in the CPU core 30 performs data reads/writes to a data cache memory management unit (DATA CACHE) 34. Both the CODE CACHE 32 and the DATA CACHE 34 generate internal bus request signals which are used to notify a Bus Interface Unit (BIU) 36 when an external memory access is required.

Traditionally, data processing systems implement tenured or connect bus interfaces, whereby the data processor retains ownership over both the address and data bus until the transaction is terminated. In a preferred embodiment, system 10 uses an arbitration protocol which allows the arbiter 14 to "fairly" allocate ownership of the address bus 22, as disclosed in a copending patent application U.S. Pat. No. 5,416,910, entitled "A Method and Apparatus for Performing Bus Arbitration in a Data Processing System", by William C. Moyer et al. and assigned to the assignee hereof. In the illustrated form of the present invention, system 10 employs multiple bus masters but does not support split bus transactions. In split bus transactions, different devices may control the address bus 22, and data bus 24, at one time, therefore, the bus masters must arbitrate for ownership of both the address bus 22, and the data bus 24.

In a preferred embodiment of the present invention, however, the data bus 24 can be continuously granted to the bus masters and arbitration is only required for address bus 22 mastership. Each potential bus master (data processor 12, and alternate bus masters 16–17) has an independent bus request output signal, $BR_1^*$, $BR_2^*$, and $BR_3^*$ respectively, and an independent bus grant input signal, $BG_1^*$, $BG_2^*$, and $BG_3^*$ respectively, which are used to perform address bus 22 arbitration. An address bus busy (ABB*) signal line (FIG. 2) is shared by the bus masters, via an arbitration bus 20. The bi-directional ABB* signal is asserted by the current bus master to notify potential bus masters that the address bus 22 is currently not available. Accordingly, the ABB* signal is an output signal from the current bus master, and an input to all potential bus masters.

As illustrated in FIG. 1, data processor 12 is capable of generating independent and overlapping internal requests for external bus access. Essentially, an internal bus request could be generated simultaneously from the instruction side and the load/store side. Alternatively, an internal request could come from the load/store side while the instruction side is already external bus owner and performing an external bus instruction fetch (or vice versa). Since the BIU 36 may receive multiple independent internal requests for address bus 22 access, data processor 12 employs an internal arbitration scheme. Typically, the need for internal arbitration occurs only when both the DATA CACHE 32 and the CODE CACHE 34 are processing cache misses. In the internal arbitration scheme, snoop copybacks have the highest internal priority for access to the external address shared bus 22, in accordance with the present invention. Snoop copybacks are burst writes which update the external memory system 18 with the most current version of a particular cache line. Since data processor 12 uses a writeback DATA CACHE 32, a write to a given cache line can cause the corresponding address in memory 18 to contain "dirty"(stale) data. When other bus masters 16–17 attempt to access this stale data in memory system 18, data processor 12 must intervene and update the memory system 18 with a snoop copyback. The snoop copyback operation is performed to allow the bus master (e.g. data processor 12) having the modified cache line to "copyback" the cache line to the memory system 18, prior to allowing a requesting bus master (e.g. bus master 16) to access the data (cache line) in the memory system 18. Thus, snoop copybacks are given the highest internal priority because the forward progress of the other processors on the address bus 22 may be stalled until the update of memory system 18 is allowed to take place.

In accordance with a preferred embodiment of the present invention, system 10 uses a snoop-retry coherency scheme. The snoop-retry coherency scheme allows each bus master to monitor bus transactions performed by the other bus masters and to intervene in the access, when required, in order to maintain cache coherency. For the purpose of simplification, the operation of the present invention is described using the terms "initiating processor", and "snooping processor". The initiating processor is the bus master at the beginning of a bus transaction, and the snooping processor is the device (processor or memory) that snoops the bus transaction. The snooping processor snoops a bus transaction by monitoring externally initiated bus transactions and comparing all global addresses to the internal data cache tags. A snoop hit occurs when the DATA CACHE 32 tag for a valid entry matches the address on bus 22. Essentially, the data processors 12 and alternate bus masters 16–17 maintain two separate, independently accessible copies of the tags to allow bus snooping to occur in parallel with on-chip processor data cache accesses.

Thus, for example, data processor 12 monitors external bus transactions (when snooping is enabled), and detects a match between an address and one of the tags in DATA CACHE 32, thereby causing the occurrence of a snoop "hit". As illustrated in FIG. 1, if the snoop hits on a modified entry in DATA CACHE 32, data processor 12 will assert its snoop status signal (SSTAT*). In a preferred embodiment of system 10, the timing for the SSTAT* and ARTRY* signals allow the SSTAT* output signal from a snooping processor (e.g. data processor 12) to be directly or indirectly connected to the ARTRY* input signal of each bus master 16–17. Thus, the assertion of the ARTRY* signal, via the SSTAT* signal from data processor 12, forces the initiating processor (e.g. bus master 16) to retry the memory access after the modified data has been written to memory 18 by data processor 12. Accordingly, in response to the assertion of its ARTRY* signal, the initiating processor (bus master 16) would then abort its bus transaction and release the address bus 22 and data bus 24.

In accordance with the present invention, when ARTRY* is asserted, all other potential bus masters (e.g. alternate bus master 17) will remove (negate) their bus request signal and ignore any bus grant signal from arbiter 14. Each potential bus master will then continue to suppress the assertion of its BR* signal to insure that arbiter 14 receives no bus request, other than the bus request from the snooping processor (data processor 12), until the ARTRY* signal is negated. This suppression scheme allows the snooping processor (data processor 12) to acquire mastership of the address bus 22 to write-back the modified cache line to memory 18.

Figure 2:
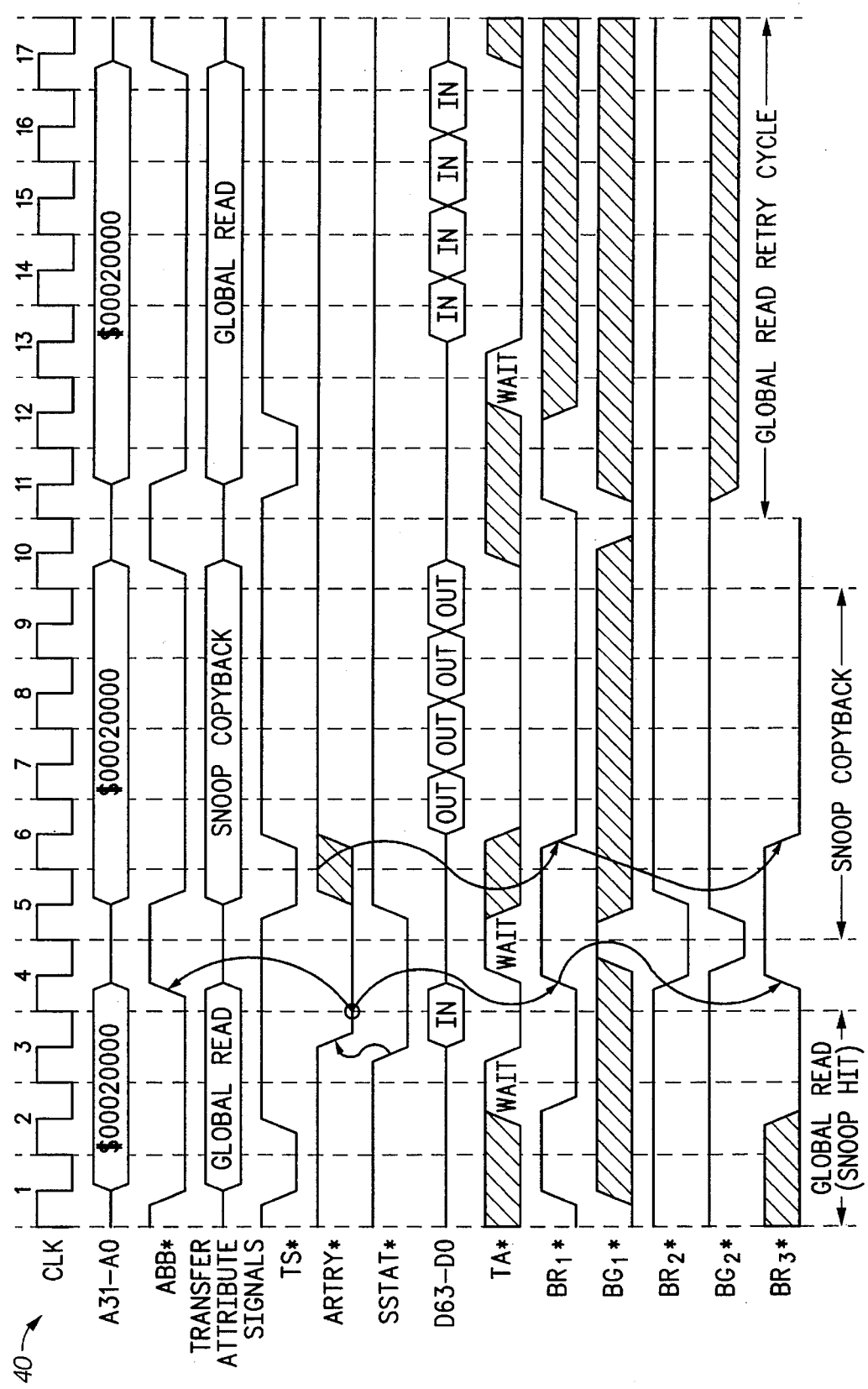
FIG. 2 illustrates, in timing diagram form, a snoop-retry protocol for use in the data processing system of FIG. 1, in accordance with the present invention.

Illustrated in FIG. 2 is a timing diagram 40 illustrating the operation of the suppression scheme of the snoop-retry protocol of the present invention. In FIG. 2, the shaded portion of a signal indicates a "don't care" condition. In the example, during a first clock period (CLK1), an initiating processor (e.g. data processor 12) is the current bus master, and initiates a read of a cache line by driving a predetermined address (herein depicted as "$00020000"), having bits A31–A0, for a requested cache line onto the shared address bus 22. Since data processor 12 is the current owner of the address bus 22, it asserts the ABB* signal, thereby indicating that the address bus 22 is currently occupied. In the illustrated example, the requested address is a "dirty" address, and only one processor (e.g. alternate bus master 16) has a copy of the data for the requested cache line stored in its internal data cache. Since the requested cache line has been modified (i.e. the cache line is "dirty"), alternate bus master 16 must update the memory system 18 with the modified cache line prior to allowing data processor 12 to access the data (D63-D0) in the stale cache line in the memory system 18. Accordingly, during the third clock period (CLK3), alternate bus master 16 detects the snoop "hit", and responds by asserting its SSTAT* signal. Since the SSTAT* signal is coupled to ARTRY* signal, the ARTRY* signal is also asserted during the third CLK period.

On the rising edge of the fourth clock period (CLK4), data processor 12 (initiating processor) detects the assertion of the ARTRY* signal, and responds by removing (negating)

its bus request (BR$_1$*) signal, and negating the ABB* signal to thereby release the address bus 22. Since alternate bus master 16 asserted its SSTAT* signal (in response to detecting the snoop hit), it asserts its own bus request (BR$_2$) signal, in response to the negation of the BR$_1$* signal by data processor 12. As previously indicated, when ARTRY* is asserted, all other potential bus masters (i.e. alternate bus master 17) will remove (negate) their bus request signals and ignore any bus grant signal from arbiter 14. Accordingly, during the fourth clock period (CLK4), alternate bus master 17 negates its bus request (BR$_3$*) signal, thereby enabling the arbiter 14 to grant bus mastership to the snooping processor (alternate bus master 16).

During the fifth clock cycle (CLK5), the alternate bus master 16 detects a qualified bus grant, and begins its snoop copyback operation. Since the ABB* signal was negated by data processor 12 when it released the address bus 22, the snoop status (SSTAT*) and address retry (ARTRY*) signals are negated, and data processor 12 reasserts its bus request (BR$_1$) signal. The alternate bus master 16, having taken ownership of the address bus 22, asserts the ABB* signal, and drives the address for the requested cache line onto address bus 22.

During the sixth clock period (CLK6), since the ARTRY* signal is now negated, data processor 12 (initiating processor) and alternate bus master 17 re-assert their bus request signals, BR$_1$* and BR$_3$*, respectively. The alternate bus master 16 begins transferring the data for the requested cache line out to the memory system 18, via data bus 24. Upon completion of the snoop copyback, the alternate bus master 16 negates the ABB* signal, during clock period ten (CLK10) to thereby indicate the address bus 22 is currently available. The arbiter 14 grants data processor 12 mastership of the address bus 22 by asserting the BG$_1$* signal. During the eleventh clock cycle (CLK11), data processor 12 detects the receipt of a qualified bus grant, and completes the global read transaction by taking ownership of the address bus 22 and asserting the ABB* signal.

Thus, in accordance with the present invention, upon detecting a snoop hit, a snooping processor asserts a snoop status signal (SSTAT*), which causes the assertion of a shared address retry (ARTRY*) signal. Upon receiving the ARTRY* signal, every potential bus master (except for the snooping processor attempting a memory update) removes (negates) their bus request signals, and ignores any bus grant signals already received from arbiter 14. Once the arbiter 14 detects the negation of the bus request signal by all the other potential bus masters, the arbiter 14 responds by negating any previously asserted bus grant signal. Thus, the snooping processor being the only device with an asserted bus request signal is assured ownership of the address bus 22 during the next bus tenure. The arbiter 14 asserts the bus grant signal for the snooping processor, thereby enabling the snooping processor to expeditiously perform the snoop copyback transaction.

While the present invention has been described in accordance with a preferred embodiment, it should be apparent to one of ordinary skill in the art that the invention may be practiced in numerous ways. For example, in the illustrated form, arbiter 14 is a synchronous state machine which responds to transitions of the bus request signals on a rising clock edge. It would be apparent to one of ordinary skill in the art that arbiter 14 could be implemented asynchronously, assuming the arbiter logic was fast enough to accommodate the timing requirements (e.g. one clock arbitration) of system 10. Furthermore, a generic termination control signal, such as, transfer acknowledge (TA*) could be employed to qualify the ARTRY* signal, and to thereby inform the initiating processor to terminate the bus transaction. Moreover, using other generic control signals, the present invention may be practiced to prioritize bus mastership between multiple bus masters for other than a snoop-retry protocol. Accordingly, it is intended by the appended claims to cover all modifications of the invention which fall within the true spirit and scope of the invention.

We claim:

1. In a data processing system having a predetermined number of potential bus master devices, wherein each of said predetermined number of potential bus master devices accesses an external memory system via a plurality of shared buses, a method for implementing a bus arbitration protocol using an arbiter, coupled to each of said predetermined number of potential bus master devices, said arbiter receiving a plurality of bus request signals individually generated by said predetermined number of potential bus masters, and selectively asserting one of a plurality of bus grant signals in response thereto, to control allocation of bus ownership between each of said predetermined number of potential bus masters, said method comprising the steps of:

asserting, via a first slave device, a first control signal and a second control signal in response to detecting an occurrence of a snoop hit during a first bus transaction initiated by a first master device on a first shared bus, said first control signal indicating that a data entry requested from said memory system by said first master device, during said first bus transaction, has been modified by said first slave device and that said memory system requires updating from said first slave device, said second control signal notifying said first master device to re-try said first bus transaction after said memory system has been updated by said first slave device;

detecting, via said first master device and each of said predetermined number of potential bus master devices, assertion of said second control signal by said first slave device, said first master device terminating said first bus transaction by negating a first bus request signal, to allow said first slave device to assert a second bus request signal, and said first master device relinquishing ownership of said first shared bus by negating a third control signal in response to assertion of said second control signal, each of said predetermined number of potential bus master devices removing their individual bus request signals from said arbiter and ignoring any bus grant signal already received from said arbiter; and suppressing assertion of said bus request signals, by each of said predetermined number of potential bus master devices, until said first slave device receives a bus grant signal from said arbiter and initiates a second bus transaction to update said memory system.

2. The method of claim 1 further comprising the steps of:

asserting, via said arbiter, a first bus grant signal to grant ownership of said first shared bus to said first slave device, in response to said first master device negating said third control signal, said first slave device thereafter negating said first control signal and said second control signal and commencing said second bus transaction to update said memory system;

re-asserting, via said first master device said first bus request signal to retry said first bus transaction and each of said predetermined number of potential bus master devices re-asserting their individual bus request signals, in response to said first slave device negating said first control signal and said second control signal; and granting, via said arbiter, said first master device ownership of said first shared bus, to allow said first master device to retry said first bus transaction, upon completion by said first slave device of said second bus transaction.

3. In a data processing system having a predetermined number of bus masters, wherein each of said predetermined number of potential bus masters accesses an external memory system via a plurality of shared buses, a method for implementing a snoop-retry bus arbitration protocol using an arbiter, coupled to each of said predetermined number of bus masters, to control allocation of bus ownership between each of said predetermined number of potential bus masters, said method comprising the steps of:

asserting, via a snooping processor, a first control signal and a second control signal in response to detecting a snoop hit during a first bus transaction initiated by a first master device on a first shared bus, said first control signal indicating that a cache line requested from said memory system, during said first bus transaction, has been modified by said snooping processor and that said memory system requires updating by said snooping processor with a current version of said cache line, said second control signal notifying said first master device to relinquish ownership of said first shared bus and retry said bus transaction after said snooping processor updates said memory system;

detecting, via said first master device and each of a predetermined number of potential bus masters, assertion of said second control signal, said first master device terminating said first bus transaction by negating a first bus request signal, and relinquishing ownership of said first shared bus by negating a third control signal in response to detecting assertion of said second control signal, said snooping processor asserting a second bus request signal to acquire bus ownership from said arbiter, each of said predetermined number of potential bus masters removing an individual bus request signal from said arbiter and ignoring any bus grant signal already received from said arbiter; and suppressing assertion, by each of said predetermined number of potential bus masters, of said bus request signal until said arbiter grants bus ownership to said snooping processor.

4. The method of claim 3 further comprising the steps of: asserting, via said arbiter, a first bus grant signal in response to said first master device negating said third control signal to relinquish ownership of said first shared bus, to grant ownership of said first shared bus to said snooping processor, said snooping processor thereafter negating said first control signal and said second control signal and commencing a second bus transaction to update said memory system;

re-asserting, via said first master device said first bus request signal to retry said first bus transaction, and each of said predetermined number of potential bus master devices re-asserting their individual bus request signals, in response to said snooping processor negating said first control signal and said second control signal;

detecting, via said arbiter, re-assertion of each individual bus request signal by said first master device and said predetermined number of potential bus master devices; and granting, via said arbiter, said first master device ownership of said first shared bus after said snooping processor updates said memory system during said second bus transaction.

5. The method of claim 3 wherein said step of detecting, via said first master device and each of a predetermined number of potential bus masters, assertion of said second control signal comprises the step of monitoring a shared signal line of a second shared bus, said shared signal line informing each of said predetermined number of potential bus masters notifying said first master device to terminate said first bus transaction.

6. The method of claim 3 wherein said step of suppressing assertion, by each of said predetermined number of potential bus masters, of said individual bus request signal occurs until said snooping processor detects said first shared bus is available and negates said first control signal and said second control signal.

7. In a data processing system having a predetermined number of bus masters each of which accesses an external memory system via a plurality of shared buses, a method for implementing a snoop-retry bus arbitration protocol using an arbiter, coupled to each of said predetermined number of bus masters, to control allocation of bus ownership between each of said plurality of shared buses, said method comprising the steps of:

monitoring, via each of a number of potential bus masters, a first bus transaction performed by a first master device on a first shared bus to detect whether an address for a requested data entry is resident in a snooping one of said potential bus masters;

providing, via said snooping one of said potential bus masters, a first control signal and a second control signal in response to said snooping one of said potential bus masters detecting that said address for said requested data entry is resident in said snooping one of said potential bus masters and that said requested data entry stored at said address has been modified;

relinquishing, via said first master device, ownership of said first shared bus in response to receiving said second control signal by negating a third control signal, said first bus master thereafter removing a bus request signal from said arbiter;

detecting assertion of said first control signal and said second control signal, via each of said potential bus masters, and removing said bus request signal generated by each of said potential bus masters from said arbiter, in response to detecting assertion of said second control signal, each of said potential bus masters thereafter ignoring any bus grant signal previously received from said arbiter; and suppressing assertion, by said first master device, of said bus request signal until said snooping one of said potential bus masters detects said first shared bus is available and negates said first control signal and said second control signal.

8. The method of claim 7 further comprising the steps of: negating, via said snooping one of said potential bus masters, said first control signal and said second control signal, in response to detecting negation of said third control signal by said first master device, said snooping one of said potential bus masters thereafter commencing a second bus transaction to update said memory system with a modified data entry stored at said requested address;

re-asserting, via said first bus master and each of said predetermined number of potential bus master devices, said individual bus request signal, in response to said snooping one of said potential bus masters negating said first control signal and said second control signal;

detecting, via said arbiter, re-assertion of said bus request signal by said first master device; and granting, via said arbiter, said first master device ownership of said first shared bus upon completion by said snooping one of potential bus masters of a second bus transaction.

9. A data processing system, including a memory, for performing a snoop-retry bus arbitration protocol to control allocation of bus ownership for each of a predetermined number of shared buses, said data processing system comprising:

first means for detecting assertion of each of a plurality of independent bus request signals and for selectively asserting in response thereto each of a plurality of independent bus grant signals;

second means coupled to said first means and each of said predetermined number of shared buses, said second means being a first bus master of a first shared bus;

third means coupled to said first means and each of said predetermined number of shared buses, said third means snooping a first bus transaction performed by said first bus master and asserting a first control signal and a second control signal, in response to detecting that a data entry requested by said second means during said first bus transaction has been modified and a copy of said modified data entry is resident in said third means, said second control signal notifying said first bus master to relinquish ownership of said first shared bus and to retry said bus transaction after said third means updates said memory system with said modified data entry, said second means negating a first bus request signal from said first means, in response to receiving said asserted second control signal from said third means; and fourth means coupled to said first means and each of a predetermined number of shared buses, said fourth means removing a second bus request signal from said first means in response to receiving said second control signal from said third means, said fourth means thereafter ignoring any bus grant signal already received from said first means, said second means and said fourth means suppressing re-assertion of their independent bus request signals until said third means detects said first shared bus is available and negates said first control signal and said second control signal.

10. The data processing system of claim 9 further comprising a memory system coupled to said second means, said third means, and said fourth means, via said predetermined number of shared buses.

11. The data processing system of claim 9 wherein said first means comprises an arbiter for supporting a snoop copyback update of said memory system by said third means, said arbiter asserting a second bus grant signal to grant ownership of said first shared bus to said third means, in response to said third means detecting that said data entry has been modified and requesting bus mastership from said arbiter and said second means negating said first bus request signal.

12. The data processing system of claim 9 wherein said second means and said fourth means suppress assertion of their independent bus request signals, until said third means negates said first control signal and said second control signal, to enable said first means to grant bus mastership to said second means to retry said first bus transaction.

* * * * *